United States Patent
Zhang et al.

(10) Patent No.: US 12,436,934 B2
(45) Date of Patent: Oct. 7, 2025

(54) METHOD AND DEVICE FOR PROCESSING DATABASE TASKS, HOT AND COLD DATA

(71) Applicants: Alibaba Cloud Computing Co., Ltd., Zhejiang (CN); Alibaba (China) Co., Ltd., Zhejiang (CN)

(72) Inventors: Teng Zhang, Hangzhou (CN); Jian Tan, Sunnyvale, CA (US); Jianying Wang, Hangzhou (CN); Feifei Li, Hangzhou (CN)

(73) Assignee: Alibaba Cloud Computing Co., Ltd., Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/584,837

(22) Filed: Feb. 22, 2024

(65) Prior Publication Data
US 2024/0248886 A1 Jul. 25, 2024

Related U.S. Application Data

(63) Continuation of application No. PCT/CN2022/112559, filed on Aug. 15, 2022.

(30) Foreign Application Priority Data
Aug. 23, 2021 (CN) .......................... 202110968775.8

(51) Int. Cl.
*G06F 16/22* (2019.01)
*G06F 16/2455* (2019.01)

(52) U.S. Cl.
CPC ...... *G06F 16/2282* (2019.01); *G06F 16/2246* (2019.01); *G06F 16/24552* (2019.01)

(58) Field of Classification Search
CPC ............. G06F 16/2282; G06F 16/2246; G06F 16/24552
See application file for complete search history.

(56) References Cited

U.S. PATENT DOCUMENTS

2018/0123901 A1  5/2018  Yermakov et al.
2018/0373722 A1  12/2018  Ulasen et al.
(Continued)

FOREIGN PATENT DOCUMENTS

CN   102227121 A   10/2011
CN   107222645 A   9/2017
(Continued)

OTHER PUBLICATIONS

PCT International Search Report and Written Opinion mailed Oct. 27, 2022, issued in corresponding International Application No. PCT/CN2022/112559 (11 pgs.).
(Continued)

*Primary Examiner* — Kristopher Andersen
(74) *Attorney, Agent, or Firm* — Finnegan, Henderson, Farabow, Garrett & Dunner, LLP

(57) ABSTRACT

Embodiments of this application provide a database task processing method, a hot and cold data processing method, a storage engine, a device, and a storage medium. In the embodiments of this application, a database storage engine is integrated with a machine learning model, involved data samples and used resources in training of the machine learning model are dynamically adjusted by sensing a load pressure of the database storage engine, and through data collection at a storage engine level and a design of a lightweight model, online updating is performed on a model based on a background task. In this way, effectiveness and availability that the database storage engine is integrated with the machine learning model are ensured, and an accuracy rate and a recall rate of a task execution result are improved.

20 Claims, 7 Drawing Sheets

(56) References Cited

U.S. PATENT DOCUMENTS

2021/0117447 A1* 4/2021 Li ................... G06F 18/24137
2021/0158147 A1* 5/2021 Vinod ................... G06N 3/08

FOREIGN PATENT DOCUMENTS

| CN | 110134697 A | 8/2019 |
| CN | 110851079 A | 2/2020 |
| CN | 111176564 A | 5/2020 |
| CN | 112130759 A | 12/2020 |
| CN | 113033824 A | 6/2021 |
| CN | 113064930 A | 7/2021 |
| CN | 113076220 A | 7/2021 |
| CN | 113112259 A | 7/2021 |
| CN | 113168577 A | 7/2021 |
| CN | 113886382 A | 1/2022 |

OTHER PUBLICATIONS

Liuwang et al., "Parallel PRPD analysis and pattern recognition for local discharge big data," Chinese Electrical Engineering Proceedings of the CSEE, vol. 36, No. 5, 21 pages, 2016.
Xiaochao et al., "An energy consumption optimization scheme based on a new energy-driven storage system," Computer Science, vol. 45, No. 7, 16 pages, 2018.
Xinyu et al., "Design of a sensor fault data analysis system based on deep learning," Computer measurement and control, 28(6), 10 pages, 2020.
First Office Action issued in corresponding Chinese Application No. 202110968775.8 on Apr. 4, 2024, 2024 (12 pages).

* cited by examiner

METHOD AND DEVICE FOR PROCESSING DATABASE TASKS, HOT AND COLD DATA

CROSS-REFERENCE TO RELATED APPLICATIONS

This disclosure claims the benefits of priority to PCT Application No. PCT/CN2022/112559, filed on Aug. 15, 2022, which claims the benefits of priority to Chinese Patent Application No. 202110968775.8, filed on Aug. 23, 2021, both of which are incorporated herein by reference in their entireties.

TECHNICAL FIELD

This disclosure relates to the field of database technologies, and in particular, to methods and devices for processing database tasks.

BACKGROUND

As a complex system, a database has many parameters from a computing layer to a storage layer. The parameters correspond to many tasks triggered by rules. Although a manner of triggering tasks based on fixed rules is simple to implement, an accuracy rate and a recall rate of task results are low.

For example, in some databases, a log structured merge-tree (LSM-Tree) storage structure is used. By using a rule-based hot and cold data identification algorithm, for example, least recently used (LRU) or least frequently used (LFU), an LSM-Tree identifies a hot and cold degree of data, and layering storage (also referred to as tiered storage) is performed on the data based on the hot and cold degree of the data. Although storage costs can be reduced and high performance of the databases can be maintained, hot and cold data identification performed based on rules has a low accuracy rate and recall rate.

SUMMARY

The disclosed embodiments of the present disclosure provide a method, a device, and a storage medium for processing database tasks, to improve an accuracy rate and a recall rate of a task execution result.

Some embodiments of this disclosure provide a method for processing database tasks, applicable to a database storage engine integrated with a machine learning model configured to process a database task, and including: calling, in a case that the database task is triggered, the machine learning model to execute the database task, and triggering a subsequent action based on a task execution result output by the machine learning model; and determining, if a set model dynamic updating condition is met in a case that the database task is not triggered, target resource information and target sample data available for current model updating based on current load information of the database storage engine, and starting a background task to perform online updating on the machine learning model based on the target resource information and the target sample data.

Some embodiments of this disclosure provide a method for processing hot and cold data, applicable to a database storage engine integrated with a machine learning model configured to perform hot and cold data identification in a data layering application scenario, the database storage engine includes K layers of persistent storage media in the data layering application scenario, and the method includes: for any layer of persistent storage medium in previous M layers of the persistent storage media, monitoring usage of the persistent storage medium; calling, in a case that a usage rate of the persistent storage medium reaches a set usage rate threshold, the machine learning model to perform hot and cold data identification on a data block in the persistent storage medium, and outputting a hot and cold data identification result; and compressing cold data in the persistent storage medium and merging into next layer of the persistent storage medium based on the hot and cold data identification result, and prefetching hot data in the persistent storage medium to a memory of the database storage engine, where K is a positive integer greater than or equal to 2, and M is a positive integer less than K.

Some embodiments of this disclosure provide a database storage engine, where the database storage engine is integrated with a machine learning model configured to process a database task, and the database storage engine includes: a model calling module, an action trigger module, and a model updating module, where the model calling module is configured to call, in a case that the action trigger module triggers the database task, the machine learning model to execute the database task, and trigger a subsequent action based on a task execution result output by the machine learning model; and the model updating module is configured to determine, if a set model dynamic updating condition is met in a case that the action trigger module does not trigger the database task, target resource information and target sample data available for current model updating based on current load information of the database storage engine, and start a background task to perform online updating on the machine learning model based on the target resource information and the target sample data.

Some embodiments of this disclosure provide a data processing device, running a database storage engine, where the database storage engine is integrated with a machine learning model configured to process a database task, and the data processing device includes: a memory and one or more processors, where the memory is configured to store a computer program corresponding to the database storage engine; and the one or more processors are configured to execute the computer program corresponding to the database storage engine, to perform operations including: calling, in a case that the database task is triggered, the machine learning model to execute the database task, and triggering a subsequent action based on a task execution result output by the machine learning model; and determining, if a set model dynamic updating condition is met in a case that the database task is not triggered, target resource information and target sample data available for current model updating based on current load information of the database storage engine, and starting a background task to perform online updating on the machine learning model based on the target resource information and the target sample data.

Some embodiments of this disclosure provide a device for processing hot and cold data, running a database storage engine, where the database storage engine is integrated with a machine learning model configured to perform hot and cold data identification in a data layering application scenario, and the data processing device includes: a first memory and a processor; the first memory is configured to store a computer program corresponding to the database storage engine; the data processing device includes a second memory in the data layering application scenario, where the second memory is formed by K layers of persistent storage media; and the processor is configured to execute the computer program corresponding to the database storage engine, to perform operations including: for any layer of persistent storage medium in previous M layers of the persistent storage media, monitoring usage of the persistent storage medium; calling, in a case that a usage rate of the persistent storage medium reaches a set usage rate threshold, the machine learning model to perform hot and cold data identification on a data block in the persistent storage medium, and outputting a hot and cold data identification result; and compressing cold data in the persistent storage medium and merging into next layer of the persistent storage medium based on the hot and cold data identification result, and prefetching hot data in the persistent storage medium to a memory of the database storage engine, where K is a positive integer greater than or equal to 2, and M is a positive integer less than K.

Some embodiments of this disclosure provide a non-transitory computer-readable storage medium storing instructions that are executable by one or more processors of a device to cause the device to perform any of the methods described herein.

Some embodiments of this disclosure provide a computer program product, including a computer program/instructions, the computer program/the instructions, when executed by a processor, causing the processor to perform any of the methods described herein.

BRIEF DESCRIPTION OF THE DRAWINGS

The accompanying drawings described herein are used for providing a further understanding of this disclosure, and form part of this disclosure. Exemplary embodiments of this disclosure and descriptions thereof are used for explaining this disclosure, and do not constitute any inappropriate limitation to this disclosure. In the accompanying drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

As stated above, although a manner of triggering tasks based on fixed rules is simple to implement, historical information in databases is not used, and a sufficient accuracy rate can be often provided. In addition, fixed rules are difficult to adjust adaptively for different loads, resulting in a low accuracy rate and recall rate of a database task execution result. Embodiments of the present disclosure overcome this issue.

The integration of a machine learning model with a database storage engine involves a sophisticated approach, whereby data samples and associated training resources are dynamically adjusted to account for load pressure on the storage engine. Through a combination of data collection at the storage engine level and the implementation of a lightweight model that enables online updating, the efficacy and availability of the integrated system are maximized. The result is a marked improvement in the accuracy and recall rate of task execution outcomes.

Figure 1:
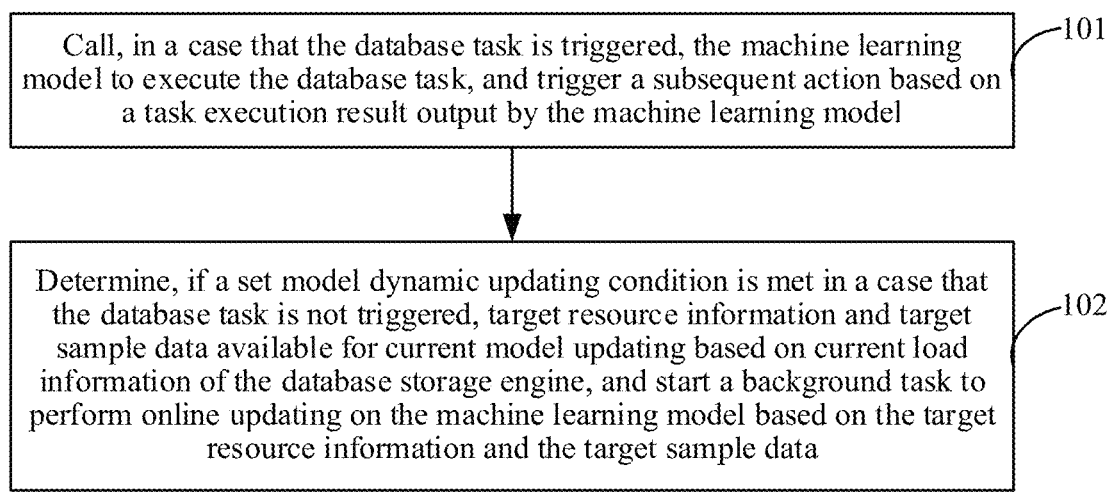
FIG. 1 is a schematic flowchart of an exemplary method for processing database tasks, according to some embodiments of this disclosure.

FIG. 1 is a schematic flowchart of an exemplary method 100 for processing database tasks, according to some embodiments of this disclosure. As shown in FIG. 1, method 100 for processing database tasks is applicable to a database storage engine and can be performed by a processing device (such as a computing device with a general-purpose processor or a special-purpose processor). The database storage engine is integrated with a machine learning model configured to process a database task, and method 100 for processing database tasks includes the following steps 101 and 102.

In step 101, the processing device calls, in a case that the database task is triggered, the machine learning model to execute the database task, and triggers a subsequent action based on a task execution result output by the machine learning model.

In step 102, the processing device determines, if a set model dynamic updating condition is met in a case that the database task is not triggered, target resource information and target sample data available for current model updating based on current load information of the database storage engine, and starts a background task to perform online updating on the machine learning model based on the target resource information and the target sample data.

In some embodiments, the database storage engine is a software organization underlying a database. The database storage engine can implement a variety of database tasks, such as a storage limit, transaction security, a locking mechanism, an index, data caching, and index caching. In some embodiments, the database storage engine is integrated with the machine learning model, so that the database storage engine can process, based on the machine learning model, the database task, for example, hot and cold data identification, task scheduling, index updating, a learned index, or a learned optimizer in a data layering scenario. The machine learning model may be but is not limited to: logistic regression, a decision tree, a support vector machine, a random forest, naive Bayes, a k-nearest neighbor (kNN) algorithm, a deep learning model, or the like.

In some embodiments, a trigger manner of the database task is not limited. In some embodiments, a background timed task periodically triggers the database task. In some embodiments, a maintainer of the database storage engine manually triggers the database task. In some embodiments, a specific event triggers the database task, and the specific event triggering the database task is different based on different application scenarios. For example, in a data layering application scenario, the database task is a hot and cold data identification task. A specific event triggering hot and cold data identification task is that if a usage rate of a storage medium that stores temporary data reaches the set usage rate threshold, the hot and cold data identification task for the temporary data is triggered. For another example, in an index updating scenario, the database task is an index updating task. A specific event triggering the index updating task is that if an amount of data added, deleted, modified, or queried in the database reaches a set threshold, the index updating task is triggered.

In some embodiments, in a case that the database task is triggered, the machine learning model may be called to execute the database task, and the subsequent action may be triggered based on the task execution result output by the machine learning model. Based on different application scenarios, the machine learning model output different task execution results, and correspondingly, triggered subsequent actions are also different. For example, in a process of performing hot and cold data identification in the data layering application scenario, the task execution result output by the machine learning model are that which data blocks are hot data and which data blocks are cold data; and the subsequent action is to store the hot data to a storage medium with a fast read and write speed or an expensive price, such as a Solid State Disk or a Solid State Drive, (collectively known as SSD), and store the cold data to a storage medium with a slow read and write speed or a low price, such as a Hard Disk Drive (HDD).

In some embodiments, in a case that the database task is not triggered, if the set model dynamic updating condition is met, dynamic updating is performed on the machine learning model. The set model dynamic updating condition may be a background timed task for triggering model updating, where the background timed task may trigger the model updating every 24 hours, trigger the model updating every week, trigger the model updating every month, or the like. In addition to this, the maintainer of the database storage engine manually may alternatively trigger dynamic updating of the model.

In some embodiments, in a case that the set model dynamic updating condition is met, the target resource information and the target sample data available for the current model updating may be determined based on the current load information of the database storage engine. The current load information may reflect a current load pressure of the database storage engine. In some embodiments, the current load information may be reflected by the current resource usage status information of the database storage engine, in other words, the current resource usage status information represents the current load information of the database storage engine. The current resource usage status information may be but is not limited to: CPU usage status information, memory usage status information, hard disk usage status information, and the like. The target resource information indicates resource information that can be occupied by the machine learning model in a dynamic updating process, for example, resources of a CPU, a memory, or a hard disk. A quantity of target sample data is sample data that can be used in a process of updating the machine learning model. If the load pressure of the database storage engine is small, it indicates that resources currently occupied by the database storage engine are small. In this case, in the process of dynamically updating the machine learning model, more pieces of target resource information and target sample data may be allocated to the model updating process. On the contrary, if the load pressure of the database storage engine is large, it indicates that the resources currently occupied by the database storage engine are large. In this case, in the process of dynamically updating the machine learning model, less pieces of target resource information and target sample data may be allocated to the model updating process, or the current model updating may be skipped. After the target resource information and the target sample data are determined, the background task may be started to perform online updating on the machine learning model based on the target resource information and the target sample data. Based on the load pressure, namely, the current load information, of the database storage engine, resources required for model updating and sample data participated in the model updating are dynamically adjusted, so that complexity of the model updating can be increased as much as possible without affecting normal processing of transactions by the database storage engine, so that effectiveness and availability that the database storage engine is integrated with the machine learning model are ensured, and an accuracy rate and a recall rate of the task execution result are improved. In addition, in some embodiments, the database storage engine is integrated with the machine learning model that may process the database task, which reduces operation and maintenance costs and management and control complexity of the database storage engine for an external service compared with a manner of using the machine learning model as an external service. In addition, in some embodiments of this disclosure, there is no need to transmit the target sample data to the external service in the process of updating the machine learning model, thereby saving transmission costs.

In some embodiments, determining the target resource information and the target sample data available for the current model updating based on current load information of the database storage engine includes: obtaining the current resource usage status information of the database storage engine; determining the target resource information and training parameters available for the current model updating based on the current resource usage status information, where the training parameters at least include a quantity of samples; and sampling, based on the quantity of samples, the target sample data from kernel mode data corresponding to the database task.

The training parameters are parameters that need to be used in the process of updating the machine learning model. For example, the training parameters include but are not limited to: a model hyperparameter, a quantity of samples, a quantity of iterations, or the like. The model hyperparameter is a configuration parameter external to the model. A value of the hyperparameter may be manually configured, or a default parameter value may be used. The model hyperparameter may be but is not limited to: a learning rate of the model, a quantity of training threads, a quantity of hidden layers of a deep neural network, a depth of the tree, or the like. The kernel mode data corresponding to the database task is a kind of data generated by the database storage engine working in a kernel mode to complete the database task. For example, the kernel mode data may include but is not limited to: historical access information or static properties of data blocks involved in the database task processed by the database storage engine, and a throughput, response time, and other indication information involved in the database task processed by the database storage engine. A static property of a data block may include but is not limited to: a size of data in the data block, table space to which the data belongs, or the like.

In some embodiments, the database storage engine may pretrain the machine learning model, to obtain a correspondence between a resource amount and the training parameters for training the machine learning model. If the resource amount for training the machine learning model is smaller, training parameters corresponding to the smaller resource amount are determined. For example, the training parameters may be a less quantity of training threads, a less quantity of iterations, a less quantity of training samples, a larger learning rate, or the like. If the resource amount for training the machine learning model is larger, training parameters corresponding to the larger resource amount are determined. For example, the training parameters may be a more quantity of training threads, a more quantity of iterations, a more quantity of training samples, a smaller learning rate, or the like. Based on this, in some embodiments of this disclosure, the target resource information available for the current model updating may be determined based on the current resource usage status information; and the training parameters available for the current model updating are determined based on the target resource information and the correspondence between the resource amount and the training parameters obtained through pretraining. For example, if the current resource usage status information indicates that the current load pressure of the database storage engine is smaller, more pieces of target resource information may be allocated to the current model updating, and the training parameters available for the current model updating are determined based on the target resource information. If the current resource usage status information indicates that the current load pressure of the database storage engine is larger, fewer pieces of target resource information may be allocated to the current model updating, and the current model updating even may be skipped.

In some embodiments, in a case that the training parameters of the machine learning model include the quantity of samples, the quantity of threads, the quantity of iterations, and the model hyperparameter, starting the background task to perform online updating on the machine learning model based on the target resource information and the target sample data includes: starting threads used for the current model updating based on the target resource information and the quantity of threads, and controlling, based on the target sample data, the quantity of iterations, and the model hyperparameter, the threads to perform online updating on the machine learning model.

Figure 2:
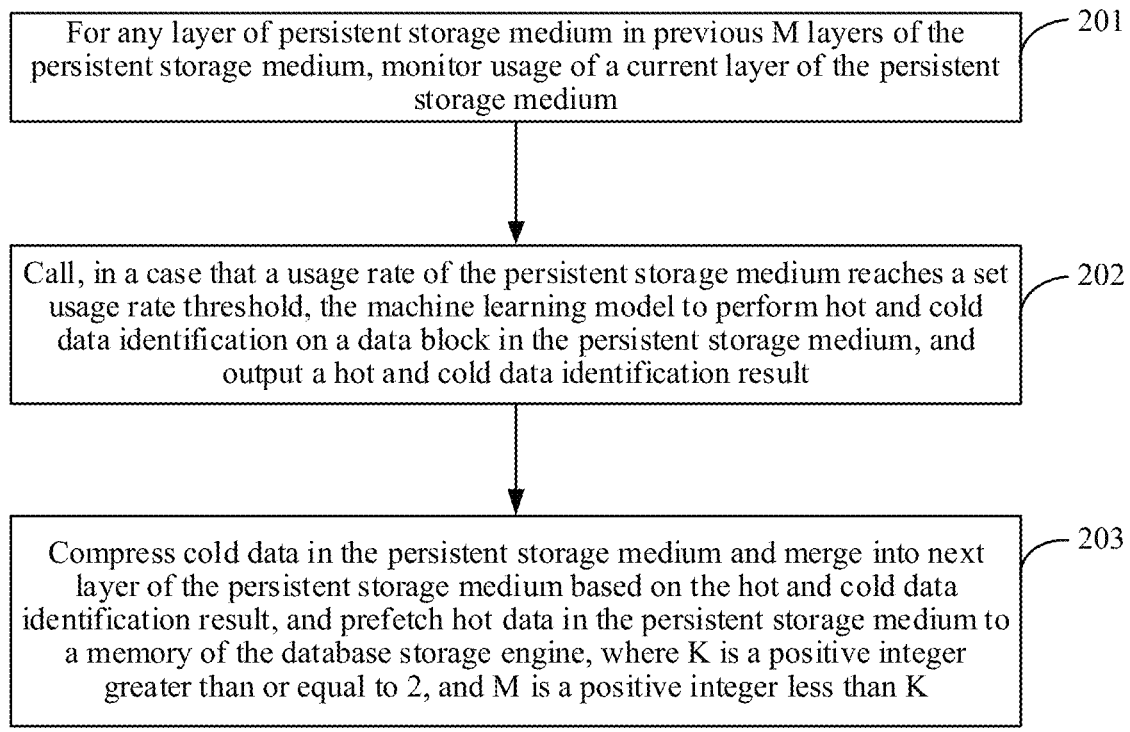
FIG. 2 is a schematic flowchart of an exemplary method for processing hot and cold data, according to some embodiments of this disclosure.

In some embodiments of this disclosure, the database task may be implemented as a hot and cold data identification task in a data layering application scenario. In the application scenario, some embodiments of this disclosure provide a method for processing hot and cold data, applicable to a database storage engine, where the database storage engine is integrated with a machine learning model configured to perform hot and cold data identification in the data layering application scenario. FIG. 2 is a schematic flowchart of an exemplary method 200 for processing hot and cold data, according to some embodiments of this disclosure. As shown in FIG. 2, method 200 includes the following steps 201 to 203, and can be performed by a processing device (such as a computing device with a general-purpose processor or a special-purpose processor).

In step 201, the processing device, for any layer of persistent storage medium in previous M layers of the persistent storage media, monitors usage of the persistent storage medium.

In step 202, the processing device calls, in a case that a usage rate of the persistent storage medium reaches a set usage rate threshold, the machine learning model to perform hot and cold data identification on a data block in the persistent storage medium, and output a hot and cold data identification result.

In step 203, the processing device compresses cold data in the persistent storage medium and then merges into next layer of the persistent storage medium based on the hot and cold data identification result, and prefetches hot data in the persistent storage medium to a memory of the database storage engine, where K is a positive integer greater than or equal to 2, and M is a positive integer less than K.

In some embodiments, the database storage engine includes K layers of persistent storage media, where K is a positive integer greater than or equal to 2. The previous M layers are configured to perform persistent storage on data from the memory, where M is a positive integer less than K. Data in the previous M layers of the persistent storage media may be cold data, or may be hot data. The cold data is data with a low access frequency and a slow efficiency requirement. The hot data is data with a high access frequency and a high processing efficiency requirement.

Figure 3A:
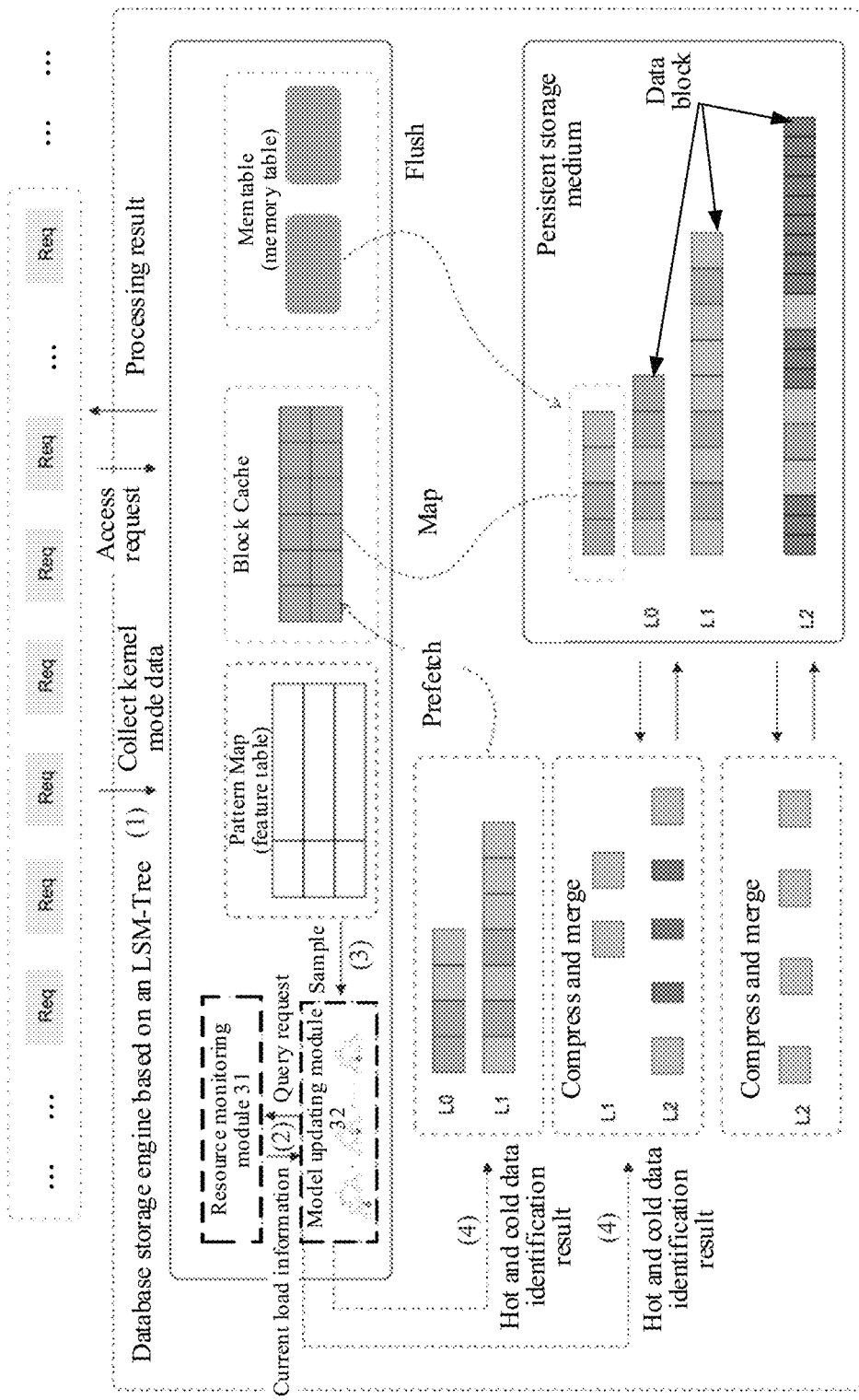
FIG. 3A is a schematic diagram of layering of an exemplary database storage engine, according to some embodiments of this disclosure.

FIG. 3A is a schematic diagram of layering of an exemplary database storage engine, according to some embodiments of this disclosure. As shown in FIG. 3A, an example in which a database storage engine based on an LSM-tree includes a three-layer persistent storage media is used for illustration, but this is not limited herein. The three layers of the persistent storage media are a L0-layer persistent storage medium, a L1-layer persistent storage medium, and a L2-layer persistent storage medium respectively. The L0-layer persistent storage medium and the L1-layer persistent storage medium are configured to perform persistent storage on data from the memory. Data in the L0-layer persistent storage medium and the L1-layer persistent storage medium may be cold data, or may be hot data. Data in the L2-layer persistent storage medium may be cold data. No matter which layer of the persistent storage medium is used, in the data layering application scenario, data in the persistent storage medium is stored in data blocks. A size of a data block may be 64 KB, 512 KB, 64 Mb, or the like.

In some embodiments, usage of the K layers of persistent storage media constantly changes. Specifically, the database storage engine may receive an access request of a user, and perform an addition, delete, modification, query, read, or write operation on a data block in a persistent storage medium in response to the access request of the user, so that usage of the persistent storage medium changes. As shown in FIG. 3A, the access request of the user is indicated by "Req". Hot data of the persistent storage medium may be stored in the memory, for example, a data block cache in FIG. 3A, to help the user rapidly read data in the data block. When writing data, the data may be written into a memory table (Memtable) written by the user. When the memory table exceeds a specific size, the memory table is frozen in the memory and becomes an immutable memory table. In addition, to skip blocking a write operation, a memory table needs to be newly generated to continue to provide a write service, and then persistent storage may be performed on the immutable memory table, in other words, the immutable memory table is flushed to the persistent storage medium in a form of data blocks. In addition to this, the database storage engine may further feed back a processing result of the access request to the user.

In some embodiments, for any layer of persistent storage medium in the previous M layers of the persistent storage media, the usage of the persistent storage medium may be monitored. In a case that the usage rate of the persistent storage medium reaches the set usage rate threshold, the machine learning model is called to perform hot and cold data identification on the data block in the persistent storage medium, and the hot and cold data identification result is output, where the usage rate threshold may be 75%, 80%, 90%, or the like. Cold data in the persistent storage medium is compressed and merged into the next layer of the persistent storage medium based on the hot and cold data identification result, and hot data in the persistent storage medium is prefetched to the memory of the database storage engine, where K is a positive integer greater than or equal to 2, and M is a positive integer less than K. A compression and merging method may include but is not limited to: temp-aware compaction, high-ratio compression, dict-compression, or the like.

Descriptions are provided below by using the database storage engine in FIG. 3A as an example. Usage of the L0-layer persistent storage medium and the L1-layer persistent storage medium is detected. In a case that a usage rate of the L0-layer persistent storage medium or the L1-layer persistent storage medium reaches the set usage rate threshold, the machine learning model is called to perform hot and cold data identification on a data block in the L0-layer persistent storage medium or the L1-layer persistent storage medium, and the hot and cold data identification result is output, as shown in step (4) in FIG. 3A. If the usage rate of the L0-layer persistent storage medium exceeds the set usage rate threshold, a data block corresponding to cold data in the L0-layer persistent storage medium is compressed and merged into the L1-layer persistent storage medium based on the hot and cold data identification result, and a data block corresponding to hot data in the L0-layer persistent storage medium is prefetched to the memory of the database storage engine. If the usage rate of the L1-layer persistent storage medium exceeds the set usage rate threshold, a data block corresponding to cold data in the L1-layer persistent storage medium is compressed and merged into the L2-layer persistent storage medium based on the hot and cold data identification result, and a data block corresponding to hot data in the L1-layer persistent storage medium is prefetched to the memory of the database storage engine.

In some embodiments, in a case that the usage rate of the previous M layers of persistent storage media does not reach the set usage rate threshold, if a set model dynamic updating condition is met, target resource information and target sample data available for current model updating are determined based on current load information of the database storage engine, and a background task is started to perform online updating on the machine learning model based on the target resource information and the target sample data. For detailed content, refer to the foregoing embodiments. Details are not described herein again.

As shown in FIG. 3A, the database storage engine includes a resource monitoring module 31, a model updating module 32, and an action trigger module. The action trigger module is not shown in FIG. 3A. As shown in FIG. 3A, resource monitoring module 31 may monitor a current load pressure of the database storage engine, that is, record the load information of the database storage engine. In a case that the usage rate of the L0-layer persistent storage medium or the L1-layer persistent storage medium does not reach the set usage rate threshold, if the set model dynamic updating condition is met, for example, the model dynamic updating condition is that model updating is triggered at one o'clock in the morning every Monday and the model dynamic updating condition is met when time reach one o'clock in the morning on Monday, dynamic updating of the model is triggered. In a process of dynamically updating the model, model updating module 32 sends a query request to resource monitoring module 31, to query the current load pressure of the database storage engine. After the query request is received, resource monitoring module 31 returns the current load information of the database storage engine to model updating module 32, as shown in step (2) in FIG. 3A. Model updating module 32 determines the target resource information and the target sample data available for the current model updating based on the current load information. Specifically, a quantity of samples for the current model updating may be determined based on the target resource information available for the current model updating, and kernel mode data in a feature table is sampled based on the quantity of samples to obtain the target sample data, as shown in step (3) in FIG. 3A. Then, model updating module 32 starts the background task to perform online updating on the machine learning model based on the target resource information and the target sample data.

In some embodiments, the database storage engine may collect access features of data blocks, namely, kernel mode data in the database storage engine. In some embodiments, historical access features of the data blocks may be collected from a data block dimension. For example, historical access intervals are recorded at a granularity of a data block, and the historical access intervals reflect a quantity of times the data block has been accessed. When collecting the historical access features, not all historical access features are collected, but each data block maintains one sliding window. For each data block in the previous M layers of the persistent storage media and a sliding window corresponding to the data block, an access feature of the data block within the sliding window is collected from the previous M layers of the persistent storage media, and the access feature of the data block is stored to the feature table. A process of collecting the kernel mode data corresponds to step (1) in FIG. 3A. In FIG. 3A, the collected kernel mode data of the data blocks is stored in the feature table (also referred to as Pattern Map) for illustration in the figure. For example, the feature table includes: a data block A1→an access feature B1, an access feature B2, ..., Bi; and a data block A2→an access feature C1, an access feature C2, ..., Ci, where i is a length of the sliding window. Based on the above, in some embodiments, based on the quantity of samples, access features of N data blocks may be sampled from the feature table corresponding to the hot and cold data identification task, where N is a positive integer greater than or equal to 2; and static properties of the N data blocks are obtained respectively from metadata of the N data blocks, and the access features and the static properties of the N data blocks are used as the target sample data.

Figure 3B:
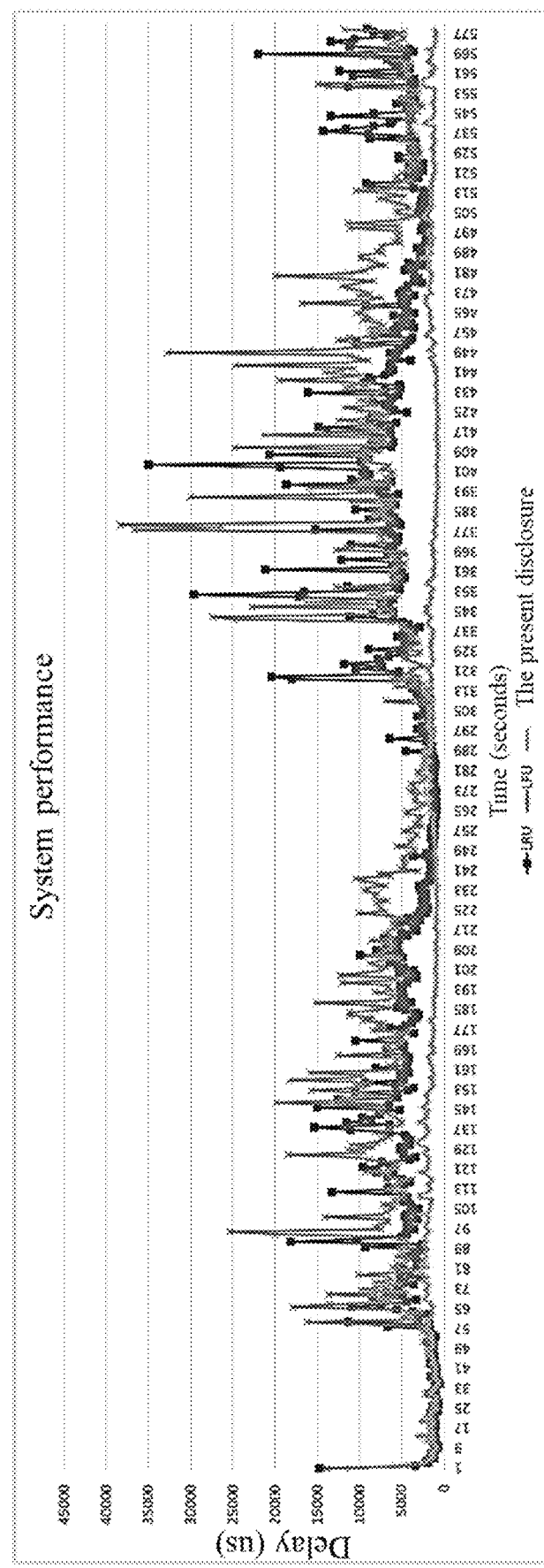
FIG. 3B is a schematic diagram illustrating effect comparison of delay performance between a technical solution of some embodiments of this disclosure and two traditional solutions of LRU and LFU.

FIG. 3B is a schematic diagram illustrating effect comparison of delay performance between a technical solution of some embodiments of this disclosure and two traditional solutions of LRU and LFU. Compared with a solution of a traditional database storage engine for hot and cold data identification, an obvious effect can be produced by using the database storage engine that is provided in some embodiments of this disclosure and that is integrated with the machine learning algorithm to perform hot and cold data identification. To reflect the obvious effect of the database storage engine provided in some embodiments of this disclosure in hot and cold data identification, experimental verification is carried out: A database for simulation is selected, and the database is an LSM-tree hybrid storage system. To save storage resources, on the LSM-tree hybrid storage system, hot data is stored by using a SSD, and cold data is stored by using an HDD. The database uses the database storage engine provided in some embodiments of this disclosure. First, historical data access information in the database is used to model access patterns, and a machine learning model for hot and cold data identification is constructed in the database storage engine. Then, two traditional solutions of LRU and LFU and the technical solution provided in some embodiments of this disclosure (simplified as "the present disclosure" in FIG. 3B) are respectively used to perform a hot and cold data identification test for the SSD used in the database, and identified cold data is transferred to the HDD and hot data is prefetched to a memory of the system. In the hot and cold data identification process, statistics were made on delay performance of the LRU, the LFU, and this disclosure, and a schematic diagram illustrating effect comparison of the delay performance between this disclosure and the two traditional solutions of LRU and LFU is obtained as shown in FIG. 3B. It can be seen from FIG. 3B that, a delay of a hot and cold separation solution based on machine learning provided in some embodiments of this disclosure can be reduced by approximately 70%.

It is to be noted that, various steps of the method provided in the foregoing embodiments of this disclosure may be executed by a same device, or may be executed by different devices. For example, step 101 and step 102 may be executed by a device A; For another example, step 101 may be executed by the device A, and step 102 may be executed by a device B; and the like.

In addition, some procedures described in the foregoing embodiments and the accompanying drawings include a plurality of operations performed in a particular order. However, it is to be noted that these operations may not be performed in the order in which these operations are performed in the specification or may be performed concurrently. Sequence numbers, such as 101 and 102, of the operations are merely used to distinguish different operations, and the sequence numbers do not represent any execution order. In addition, these procedures may include more or fewer operations, and these operations may be performed in an order or may be performed concurrently. It is to be noted that, descriptions of "first", "second", and the like in the specification are used to distinguish different messages, devices, modules, and the like, and do not indicate a sequence and do not limit that "first" and "second" are different types either.

Figure 4:
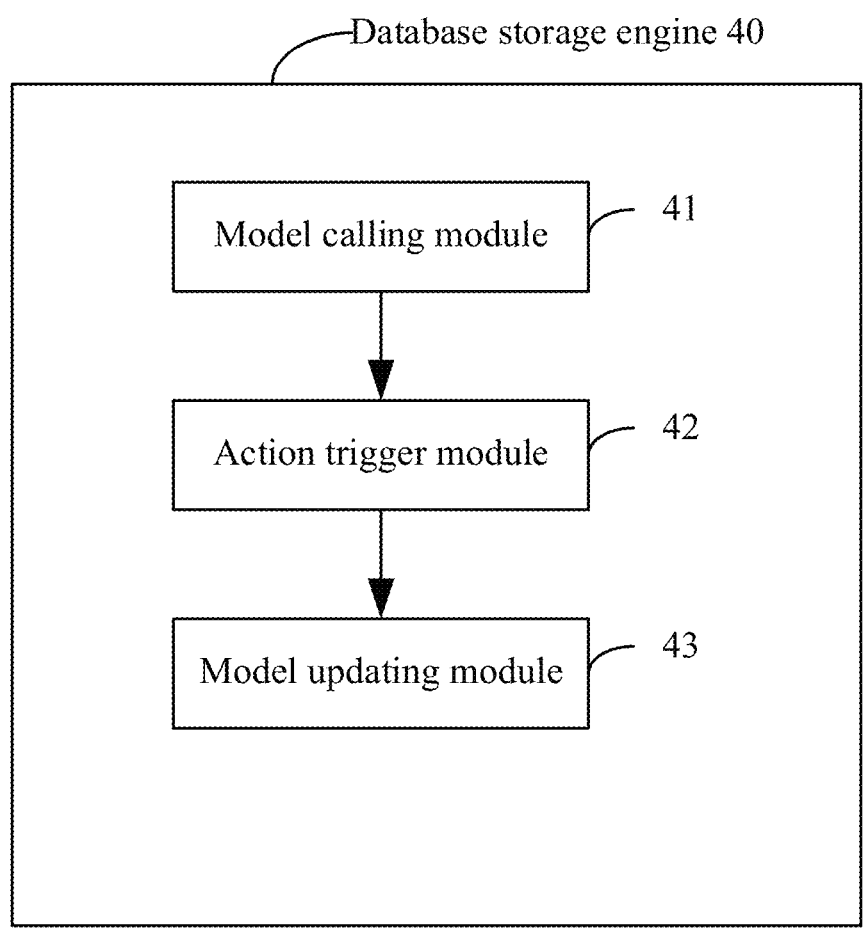
FIG. 4 is a schematic diagram of an exemplary database storage engine, according to some embodiments of this disclosure.

Based on the foregoing methods for processing database tasks, some embodiments of this disclosure provide a database storage engine, where the database storage engine is integrated with a machine learning model configured to process a database task. FIG. 4 is a schematic diagram of an exemplary database storage engine 40, according to some embodiments of this disclosure. As shown in FIG. 4, the database storage engine 40 includes a model calling module 41, an action trigger module 42, and a model updating module 43.

Model calling module 41 is configured to call, in a case that action trigger module 42 triggers the database task, the machine learning model to execute the database task, and trigger a subsequent action based on a task execution result output by the machine learning model.

Model updating module 43 is configured to determine, if a set model dynamic updating condition is met in a case that action trigger module 42 does not trigger the database task, target resource information and target sample data available for current model updating based on current load information of database storage engine 40, and start a background task to perform online updating on the machine learning model based on the target resource information and the target sample data.

In some embodiments, when the determining target resource information and target sample data available for current model updating based on current load information of database storage engine 40, model updating module 43 is configured to: obtain current resource usage status information of database storage engine 40, where the current resource usage status information represents the current load information of database storage engine 40; determine the target resource information and training parameters available for the current model updating based on the current resource usage status information, where the training parameters at least include a quantity of samples; and sample, based on the quantity of samples, the target sample data from kernel mode data corresponding to the database task.

In some embodiments, when the determining the target resource information and training parameters available for the current model updating based on the current resource usage status information, model updating module 43 is configured to: determine the target resource information available for the current model updating based on the current resource usage status information; and determine the training parameters available for the current model updating based on the target resource information and a correspondence between the resource amount and the training parameters obtained through pretraining.

In some embodiments, the training parameters further include a quantity of threads, a quantity of iterations, and a model hyperparameter; and when the starting a background task to perform online updating on the machine learning model based on the target resource information and the target sample data, model updating module 43 is configured to: start threads used for the current model updating based on the target resource information and the quantity of threads, and control, based on the target sample data, the quantity of iterations, and the model hyperparameter, the thread to perform online updating on the machine learning model.

In some embodiments, if the database task is a hot and cold data identification task in a data layering application scenario, and database storage engine 40 includes K layers of persistent storage media in the data layering application scenario, when the sampling, based on the quantity of samples, the target sample data from kernel mode data corresponding to the database task, model updating module 43 is configured to: sample, based on the quantity of samples, access features of N data blocks from a feature table corresponding to the hot and cold data identification task, where the feature table stores access features of data blocks collected from previous M layers of the persistent storage media; and obtain static properties of the N data blocks respectively from metadata of the N data blocks, and use the access features and the static properties of the N data blocks as the target sample data, where N and K are positive integers greater than or equal to 2, and M is a positive integer less than K.

In some embodiments, database storage engine 40 further includes a collection module and a storage module (not shown in FIG. 4). The collection module is configured to: for each data block in the previous M layers of the persistent storage media and a sliding window corresponding to the data block, collect an access feature of the data block within the sliding window from the previous M layers of the persistent storage media. The storage module is configured to store the access feature of the data block to the feature table.

In some embodiments, database storage engine 40 further includes a monitoring module (not shown in FIG. 4). The monitoring module is configured to: for any layer of persistent storage medium in previous M layers of the persistent storage media, monitor usage of the persistent storage medium; action trigger module 42 is configured to trigger the hot and cold data identification task in a case that a usage rate of the persistent storage medium reaches a set usage rate threshold; correspondingly, when the calling, in a case that the database task is triggered, the machine learning model to execute the database task, model updating module 43 is configured to: call the machine learning model to perform hot and cold data identification on a data block in the persistent storage medium, and output a hot and cold data identification result; and correspondingly, when the triggering a subsequent action based on a task execution result output by the machine learning model, model calling module 41 is configured to: compress cold data in the persistent storage medium and then merge into next layer of the persistent storage medium based on the hot and cold data identification result, and prefetch hot data in the persistent storage medium to a memory of database storage engine 40.

Figure 5:
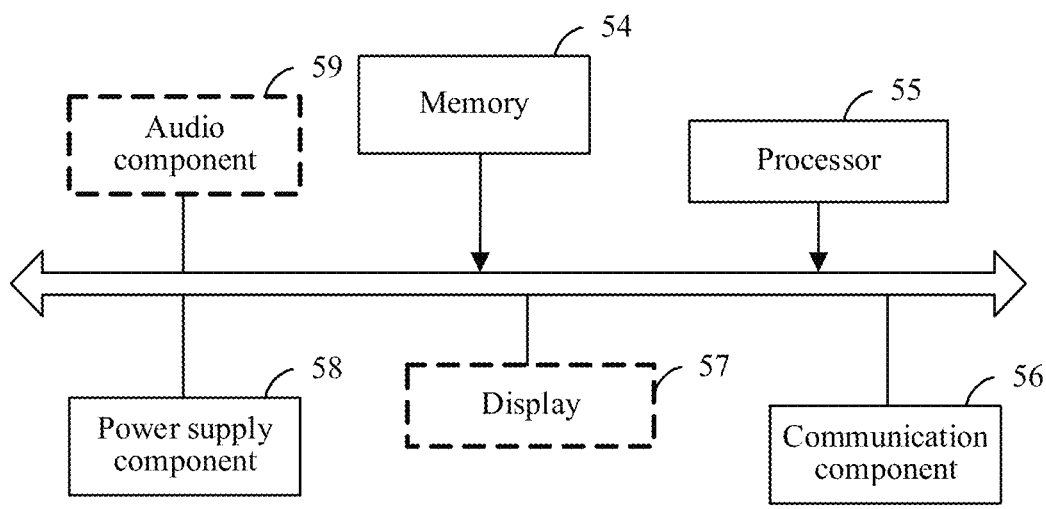
FIG. 5 is a schematic diagram of an exemplary data processing device, according to some embodiments of this disclosure.

FIG. 5 is a schematic diagram of an exemplary data processing device 50, according to some embodiments of this disclosure. Data processing device 50 runs a database storage engine, where the database storage engine is integrated with a machine learning model configured to process a database task. As shown in FIG. 5, data processing device 50 includes: a memory 54 and a processor 55.

Memory 54 is configured to store a computer program corresponding to the database storage engine, and may be configured to store other various types of data to support an operation on data processing device 50. Examples of the types of data include instructions of any application program or method to be operated on data processing device 50.

Memory 54 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc.

Processor 55 is coupled to memory 54, to execute the computer program corresponding to the database storage engine in memory 54, to perform the following steps: calling, in a case that the database task is triggered, the machine learning model to execute the database task, and triggering a subsequent action based on a task execution result output by the machine learning model; and determining, if a set model dynamic updating condition is met in a case that the database task is not triggered, target resource information and target sample data available for current model updating based on current load information of the database storage engine, and starting a background task to perform online updating on the machine learning model based on the target resource information and the target sample data.

In some embodiments, when the determining target resource information and target sample data available for current model updating based on current load information of the database storage engine, processor 55 is specifically configured to: obtain current resource usage status information of the database storage engine, where the current resource usage status information represents the current load information of the database storage engine; determine the target resource information and training parameters available for the current model updating based on the current resource usage status information, where the training parameters at least include a quantity of samples; and sample, based on the quantity of samples, the target sample data from kernel mode data corresponding to the database task.

In some embodiments, when the determining the target resource information and training parameters available for the current model updating based on the current resource usage status information, processor 55 is specifically configured to: determine the target resource information available for the current model updating based on the current resource usage status information; and determine the training parameters available for the current model updating based on the target resource information and a correspondence between the resource amount and the training parameters obtained through pretraining.

In some embodiments, the training parameters further include a quantity of threads, a quantity of iterations, and a model hyperparameter; and when the starting a background task to perform online updating on the machine learning model based on the target resource information and the target sample data, processor 55 is specifically configured to: start threads used for the current model updating based on the target resource information and the quantity of threads, and control, based on the target sample data, the quantity of iterations, and the model hyperparameter, the thread to perform online updating on the machine learning model.

In some embodiments, if the database task is a hot and cold data identification task in a data layering application scenario, and the database storage engine includes K layers of persistent storage media in the data layering application scenario, when the sampling, based on the quantity of samples, the target sample data from kernel mode data corresponding to the database task, processor 55 is specifically configured to: sample, based on the quantity of samples, access features of N data blocks from a feature table corresponding to the hot and cold data identification task, where the feature table stores access features of data blocks collected from previous M layers of the persistent storage media; and obtain static properties of the N data blocks respectively from metadata of the N data blocks, and use the access features and the static properties of the N data blocks as the target sample data, where N and K are positive integers greater than or equal to 2, and M is a positive integer less than K.

In some embodiments, processor 55 is further configured to: for each data block in the previous M layers of the persistent storage media and a sliding window corresponding to the data block, collect an access feature of the data block within the sliding window from the previous M layers of the persistent storage media, and store the access feature of the data block to the feature table.

In some embodiments, for any layer of persistent storage medium in the previous M layers of the persistent storage media, processor 55 is further configured to: monitor usage of the persistent storage medium, and trigger the hot and cold data identification task in a case that a usage rate of the persistent storage medium reaches a set usage rate threshold; when the calling, in a case that the database task is triggered, the machine learning model to execute the database task, processor 55 is specifically configured to: call the machine learning model to perform hot and cold data identification on a data block in the persistent storage medium, and output a hot and cold data identification result; and when the triggering a subsequent action based on a task execution result output by the machine learning model, processor 55 is specifically configured to: compress cold data in the persistent storage medium and then merge into next layer of the persistent storage medium based on the hot and cold data identification result, and prefetch hot data in the persistent storage medium to a memory of the database storage engine.

As shown in FIG. 5, data processing device 50 further includes a communication component 56, a display 57, a power supply component 58, an audio component 59, and other components. Only some components are schematically shown in FIG. 5, which does not mean that data processing device 50 includes only the components shown in FIG. 5. It is to be noted that, a component within a dotted box in FIG. 5 is an optional component, not a required component, and may specifically depend on a product form of data processing device 50.

Data processing device 50, in some embodiments, may be implemented as a terminal device such as a desktop computer, a laptop computer, or a smartphone, or may be implemented as a server device such as a conventional server, a cloud server, or a server array. If data processing device 50, in some embodiments, is implemented as the terminal device such as the desktop computer, the laptop computer, or the smartphone, the component within the dotted box in FIG. 5 may be included. If data processing device 50, in some embodiments, is implemented as the server device such as the conventional server, the cloud server, or the server array, the component within the dotted box in FIG. 5 may not be included.

In some embodiments of this disclosure provide a non-transitory computer-readable storage medium storing a computer program, the computer program, when executed by a processor, causing the processor to perform various steps executable by data processing device 50 in method 100 shown in FIG. 1.

In some embodiments of this disclosure provide a computer program product, including a computer program/instructions, the computer program/the instructions, when executed by a processor, causing the processor to perform steps of the method for processing database tasks, according to some embodiments of this disclosure.

Figure 6:
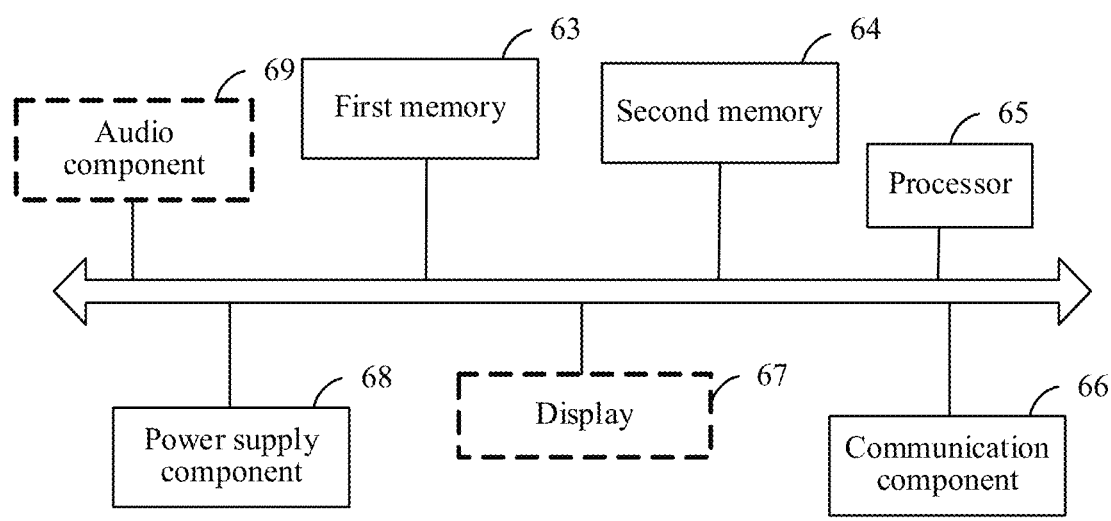
FIG. 6 is a schematic diagram of an exemplary hot and cold data processing device, according to some embodiments of this disclosure.

FIG. 6 is a schematic diagram of an exemplary hot and cold data processing device 60, according to some embodiments of this disclosure. Hot and cold data processing device 60 runs a database storage engine, where the database storage engine is integrated with a machine learning model configured to perform hot and cold data identification in a data layering application scenario. As shown in FIG. 6, hot and cold data processing device 60 includes a first memory 63, a second memory 64, and a processor 65.

First memory 63 is configured to store a computer program corresponding to the database storage engine, and may be configured to store other various types of data to support an operation on hot and cold data processing device 60. Examples of the types of data include instructions of any application program or method to be operated on hot and cold data processing device 60.

First memory 63 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc.

Second memory 64 is configured to store data blocks in the database storage engine; and second memory 64 is formed by K layers of persistent storage media, where K is a positive integer greater than or equal to 2.

Processor 65 is coupled to first memory 63, to execute the computer program corresponding to the database storage engine in first memory 63, to perform the following steps: for any layer of persistent storage medium in previous M layers of a persistent storage media, monitoring usage of the persistent storage medium; calling, in a case that a usage rate of the persistent storage medium reaches a set usage rate threshold, the machine learning model to perform hot and cold data identification on a data block in the persistent storage medium, and outputting a hot and cold data identification result; and compressing cold data in the persistent storage medium and merging into next layer of the persistent storage medium based on the hot and cold data identification result, and prefetching hot data in the persistent storage medium to a memory of the database storage engine, where K is a positive integer greater than or equal to 2, and M is a positive integer less than K.

In some embodiments, processor 65 is further configured to: determine, if a set model dynamic updating condition is met in a case that the usage rate of the persistent storage medium does not reach the set usage rate threshold, target resource information and target sample data available for current model updating based on current load information of the database storage engine, and start a background task to perform online updating on the machine learning model based on the target resource information and the target sample data.

In some embodiments, when the determining target resource information and target sample data available for current model updating based on current load information of the database storage engine, processor 65 is specifically configured to: obtain current resource usage status information of the database storage engine, where the current resource usage status information represents the current load information of the database storage engine; determine the target resource information and training parameters available for the current model updating based on the current resource usage status information, where the training parameters at least include a quantity of samples; sample, based on the quantity of samples, access features of N data blocks from a feature table, where the feature table stores access features of data blocks collected from the previous M layers of the persistent storage media; and obtain static properties of the N data blocks respectively from metadata of the N data blocks, and use the access features and the static properties of the N data blocks as the target sample data available for the current model updating, where N is a positive integer greater than or equal to 2.

As shown in FIG. 6, hot and cold data processing device 60 further includes a communication component 66, a display 67, a power supply component 68, an audio component 69, and other components. Only some components are schematically shown in FIG. 6, which does not mean that hot and cold data processing device 60 includes only the components shown in FIG. 6. It is to be noted that, a component within a dotted box in FIG. 6 is an optional component, not a required component, and may specifically depend on a product form of hot and cold data processing device 60.

Hot and cold data processing device 60, in some embodiments, may be implemented as a terminal device such as a desktop computer, a laptop computer, or a smartphone, or may be implemented as a server device such as a conventional server, a cloud server, or a server array. If hot and cold data processing device 60, in some embodiments, is implemented as the terminal device such as the desktop computer, the laptop computer, or the smartphone, the component within the dotted box in FIG. 5 may be included. If hot and cold data processing device 60, in some embodiments, is implemented as the server device such as the conventional server, the cloud server, or the server array, the component within the dotted box in FIG. 5 may not be included.

Some embodiments of this disclosure provide a non-transitory computer-readable storage medium storing a computer program, the computer program, when executed by a processor, causing the processor to perform various steps executable by hot and cold data processing device 60 in method 200 shown in FIG. 2.

Some embodiments of this disclosure provide a computer program product, including a computer program/instructions, the computer program/the instructions, when executed by a processor, causing the processor to perform steps of the method for processing hot and cold data, according to some embodiments of this disclosure.

The communication components in FIG. 5 and FIG. 6 are configured to facilitate communication between devices in which the communication components are located and other devices in a wired or wireless manner. The devices in which the communication components are located may access a communication standard-based wireless network, such as WiFi, 2G, 3G, 4G/LTE, 5G, or another mobile communication network, or a combination thereof. In some embodiments, the communication component receives a broadcast signal or broadcast related information from an external broadcast management system through a broadcast channel. In some embodiments, the communication component further includes a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

The displays in FIG. 5 and FIG. 6 each include a screen, which may include a liquid crystal display (LCD) and a touch panel (TP). If the screen includes a touch panel, the screen may be implemented as a touchscreen, to receive an input signal from the user. The touch panel includes one or more touch sensors to sense touching, sliding, and gestures on the touch panel. The touch sensor may not only sense the boundary of touching or sliding operations, but also detect duration and pressure related to the touching or sliding operations.

The power supply components in FIG. 5 and FIG. 6 provide power for components of the devices in which the power supply components are located. The power supply component may include a power supply management system, one or more power supplies, and other components related to generation, management, and allocation of power for the device in which the power supply component is located.

The audio components in FIG. 5 and FIG. 6 may be configured to output and/or input an audio signal. For example, the audio component includes a microphone (MIC). When the device in which the power supply component is located is in an operating mode, such as a call mode, a record mode, and a speech recognition mode, the microphone is configured to receive an external audio signal. The received audio signal may be further stored in the memory or transmitted through the communication component. In some embodiments, the audio component further includes a speaker, to output an audio signal.

It is appreciated that embodiments of this disclosure may be provided as a method, a system, or a computer program product. Therefore, this disclosure may take the form of total hardware embodiments (in which the modules have corresponding circuitry), total software embodiments, or embodiments combining software and hardware. In addition, this disclosure may take the form of a computer program product implemented on one or more computer-usable storage media (including but not limited to a magnetic memory, a CD-ROM, and an optical memory) including computer-usable program code.

This disclosure is described with reference to the flowcharts and/or block diagrams of the method, the device (system), and the computer program product according to some embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a special-purpose computer, an embedded processor, or a processor of a programmable data processing device to generate a machine, so that an apparatus configured to implement functions specified in one or more procedures in the flowcharts and/or one or more blocks in the block diagrams is generated by using instructions executed by the general-purpose computer or the processor of the programmable data processing device.

These computer program instructions may be stored in a computer-readable memory that can indicate the computer or the programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may also be loaded onto a computer or the programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (e.g., CPUs), an input/output interface, a network interface, and a memory.

The internal memory may include forms such as a volatile memory, a random access memory (RAM) and/or a non-volatile memory in computer-readable media, for example, a read-only memory (ROM) or a flash RAM. The internal memory is an example of the computer-readable medium.

The computer-readable medium includes a non-volatile medium and a volatile medium, a movable medium and a non-movable medium, which may implement storage of information by using any method or technology. The information may be a computer-readable instruction, a data structure, a program module, or other data. Examples of computer storage media include but are not limited to: a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present invention, the computer-readable medium does not include transitory computer-readable media (transitory media), such as a modulated data signal and a carrier.

The embodiments may further be described using the following clauses:

1. A method for processing database tasks, applicable to a database storage engine integrated with a machine learning model configured to process a database task, and including:
   calling, in a case that the database task is triggered, the machine learning model to execute the database task, and triggering a subsequent action based on a task execution result output by the machine learning model; or
   determining, if a set model dynamic updating condition is met in a case that the database task is not triggered, target resource information and target sample data available for current model updating based on current load information of the database storage engine, and starting a background task to perform online updating on the machine learning model based on the target resource information and the target sample data.

2. The method according to clause 1, wherein determining the target resource information and the target sample data available for the current model updating includes:
   obtaining current resource usage status information of the database storage engine, wherein the current resource usage status information represents the current load information of the database storage engine;
   determining the target resource information and training parameters available for the current model updating based on the current resource usage status information, wherein the training parameters at least include a quantity of samples; and
   sampling, based on the quantity of samples, the target sample data from kernel mode data corresponding to the database task.

3. The method according to clause 2, wherein determining the target resource information and the training parameters available for the current model updating includes:
   determining the target resource information available for the current model updating based on the current resource usage status information; and
   determining the training parameters available for the current model updating based on the target resource information and a correspondence between a resource amount and the training parameters obtained through pretraining.

4. The method according to clause 3, wherein the training parameters further include a quantity of threads, a quantity of iterations, and a model hyperparameter; and
   wherein starting the background task to perform online updating on the machine learning model based on the target resource information and the target sample data includes: starting threads used for the current model updating based on the target resource information and the quantity of threads, and controlling, based on the target sample data, the quantity of iterations, and the model hyperparameter, the threads to perform online updating on the machine learning model.

5. The method according to clause 2, wherein the database task is a hot and cold data identification task in a data layering application scenario, and the database storage engine includes K layers of persistent storage media in the data layering application scenario, and sampling, based on the quantity of samples, the target sample data from the kernel mode data corresponding to the database task includes:
   sampling, based on the quantity of samples, access features of N data blocks from a feature table corresponding to the hot and cold data identification task, wherein the feature table stores access features of data blocks collected from previous M layers of the persistent storage media; and
   obtaining static properties of the N data blocks respectively from metadata of the N data blocks, and using the access features and the static properties of the N data blocks as the target sample data, wherein N and K are positive integers greater than or equal to 2, and M is a positive integer less than K.

6. The method according to clause 5, further including:
   for each data block in the previous M layers of the persistent storage media, collecting an access feature of a data block within a sliding window from the previous M layers of the persistent storage media with the sliding window corresponding to the data block, and storing the access feature of the data block to the feature table.

7. The method according to clause 5, further including:
   for any layer of persistent storage medium in the previous M layers of the persistent storage medium, monitoring usage of the persistent storage medium, and triggering the hot and cold data identification task in a case that a usage rate of the persistent storage medium reaches a set usage rate threshold;
   wherein calling, in the case that the database task is triggered, the machine learning model to execute the database task includes: calling the machine learning model to perform hot and cold data identification on a data block in the persistent storage medium, and outputting a hot and cold data identification result; and
   wherein the triggering the subsequent action based on the task execution result output by the machine learning model includes: compressing cold data in the persistent storage medium and merging into next layer of the persistent storage medium based on the hot and cold data identification result, and prefetching hot data in the persistent storage medium to a memory of the database storage engine.

8. A method for processing hot and cold data, applicable to a database storage engine integrated with a machine learning model configured to perform hot and cold data identification in a data layering application scenario, the database storage engine includes K layers of persistent storage media in the data layering application scenario, and the method includes:
   for any layer of persistent storage medium in previous M layers of the persistent storage media, monitoring usage of the persistent storage medium;
   calling, in a case that a usage rate of the persistent storage medium reaches a set usage rate threshold, the machine learning model to perform hot and cold data identification on a data block in the persistent storage medium, and outputting a hot and cold data identification result; and compressing cold data in the persistent storage medium and merging into next layer of the persistent storage medium based on the hot and cold data identification result, and prefetching hot data in the persistent storage medium to a memory of the database storage engine, wherein K is a positive integer greater than or equal to 2, and M is a positive integer less than K.

9. The method according to clause 8, further including:

if a set model dynamic updating condition is met in a case that the usage rate of the persistent storage medium does not reach the set usage rate threshold, then determining target resource information and target sample data available for current model updating based on current load information of the database storage engine, and starting a background task to perform online updating on the machine learning model based on the target resource information and the target sample data.

10. The method according to clause 9, wherein determining the target resource information and the target sample data available for the current model updating based on the current load information of the database storage engine includes:

obtaining current resource usage status information of the database storage engine, wherein the current resource usage status information represents the current load information of the database storage engine;

determining the target resource information and training parameters available for the current model updating based on the current resource usage status information, wherein the training parameters at least include a quantity of samples;

sampling, based on the quantity of samples, access features of N data blocks from a feature table, wherein the feature table stores access features of data blocks collected from the previous M layers of the persistent storage media; and obtaining static properties of the N data blocks respectively from metadata of the N data blocks, and using the access features and the static properties of the N data blocks as the target sample data available for the current model updating, wherein N is a positive integer greater than or equal to 2.

11. A database storage engine, wherein the database storage engine is integrated with a machine learning model configured to process a database task, and the database storage engine includes a model calling module, an action trigger module, and a model updating module, wherein the model calling module is configured to call, in a case that the action trigger module triggers the database task, the machine learning model to execute the database task, and trigger a subsequent action based on a task execution result output by the machine learning model; and the model updating module is configured to determine, if a set model dynamic updating condition is met in a case that the action trigger module does not trigger the database task, target resource information and target sample data available for current model updating based on current load information of the database storage engine, and start a background task to perform online updating on the machine learning model based on the target resource information and the target sample data.

12. A data processing device, running a database storage engine, wherein the database storage engine is integrated with a machine learning model configured to process a database task, and the data processing device includes: a memory and a processor, wherein the memory is configured to store a computer program corresponding to the database storage engine; and the processor is configured to execute the computer program corresponding to the database storage engine, to perform operations including:

calling, in a case that the database task is triggered, the machine learning model to execute the database task, and triggering a subsequent action based on a task execution result output by the machine learning model; and determining, if a set model dynamic updating condition is met in a case that the database task is not triggered, target resource information and target sample data available for current model updating based on current load information of the database storage engine, and starting a background task to perform online updating on the machine learning model based on the target resource information and the target sample data.

13. A device for processing hot and cold data, running a database storage engine, wherein the database storage engine is integrated with a machine learning model configured to perform hot and cold data identification in a data layering application scenario, and the data processing device includes: a first memory and one or more processors; the first memory is configured to store a computer program corresponding to the database storage engine; the data processing device includes a second memory in the data layering application scenario, wherein the second memory is formed by K layers of persistent storage media; and the one or more processors are configured to execute the computer program corresponding to the database storage engine, to perform operations including:

for any layer of persistent storage medium in previous M layers of the persistent storage media, monitoring usage of the persistent storage medium;

calling, in a case that a usage rate of the persistent storage medium reaches a set usage rate threshold, the machine learning model to perform hot and cold data identification on a data block in the persistent storage medium, and outputting a hot and cold data identification result; and compressing cold data in the persistent storage medium and merging into next layer of the persistent storage medium based on the hot and cold data identification result, and prefetching hot data in the persistent storage medium to a memory of the database storage engine, wherein K is a positive integer greater than or equal to 2, and M is a positive integer less than K.

14. A non-transitory computer-readable storage medium storing instructions that are executable by one or more processors of a device to cause the device to perform any of the methods described herein.

It is to be noted that, the terms such as "first" and "second" in the specification and claims of this disclosure and the above accompanying drawings are used for distinguishing similar objects but not necessarily used for describing particular order or sequence. It is to be understood that such used data is interchangeable where appropriate so that the examples of this disclosure described here can be implemented in an order other than those illustrated or described here. Moreover, the terms "include", "have" and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It should be understood that the disclosed technical content may be implemented in other ways. The apparatus embodiments described above are only schematic. For example, the division of the units is only a logical function division. In actual implementations, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, units, or modules, which may be in electrical or other forms.

The units described as separate components may or may not be physically separated, and the components displayed as units may or may not be physical units, that is, they may be located in one place or may be distributed to a plurality of network units. Part of or all the units may be selected according to actual needs to achieve the purpose of the solution of the present embodiment.

In addition, the functional units in various embodiments of the present disclosure may be integrated into one processing unit, or each unit may exist alone physically, or two or more units may be integrated into one unit. The integrated units described above may be implemented either in the form of hardware or in the form of a software functional unit.

If the integrated units are implemented in the form of a software functional unit and sold or used as an independent product, they may be stored in a quantum computer-readable storage medium. Based on such an understanding, the technical solutions of the present disclosure essentially, or the part making contributions to the prior art, or all or part of the technical solutions may be embodied in the form of a software product. The quantum computer software product is stored in a storage medium and includes several instructions used for causing a quantum computer device to execute all or part of steps of the methods in various embodiments of the present disclosure.

The foregoing descriptions are merely preferred implementations of the present disclosure. It is to be noted that a plurality of improvements and refinements may be made by those of ordinary skill in the technical field without departing from the principle of the present disclosure, and shall fall within the scope of protection of the present disclosure.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for processing database tasks, applicable to a database storage engine integrated with a machine learning model configured to process a hot-and-cold data identification task in a data layering application scenario, and the database storage engine comprises K layers of persistent storage medium in the data layering application scenario, and the method comprising:
   monitoring a usage rate of the persistent storage medium for any layer of persistent storage medium in a previous M layers of the persistent storage medium;
   calling, in response to the usage rate of the persistent storage medium having reached a set usage rate threshold, the machine learning model to perform the hot-and-cold data identification task, and triggering a subsequent action based on a task execution result output by the machine learning model;
   wherein the triggering the subsequent action based on the task execution result output by the machine learning model comprises: compressing cold data in the persistent storage medium and merging into next layer of the persistent storage medium based on the hot-and-cold data identification result, and prefetching hot data in the persistent storage medium to a memory of the database storage engine, wherein K is a positive integers greater than or equal to 2, and M is a positive integer less than K; and
   determining, in response to the usage rate of the persistent storage medium having not reached the set usage rate threshold and a set model dynamic updating condition being met, target resource information and target sample data available for current model updating based on current load information of the database storage engine, and starting a background task to perform online updating on the machine learning model based on the target resource information and the target sample data.

2. The method according to claim 1, wherein determining the target resource information and the target sample data available for the current model updating comprises:
   obtaining current resource usage status information of the database storage engine, wherein the current resource usage status information represents the current load information of the database storage engine;
   determining the target resource information and training parameters available for the current model updating based on the current resource usage status information, wherein the training parameters at least comprise a quantity of samples; and
   sampling, based on the quantity of samples, the target sample data from kernel mode data corresponding to the database task.

3. The method according to claim 2, wherein determining the target resource information and the training parameters available for the current model updating comprises:

determining the target resource information available for the current model updating based on the current resource usage status information; and determining the training parameters available for the current model updating based on the target resource information and a correspondence between a resource amount and the training parameters obtained through pretraining.

4. The method according to claim 3, wherein the training parameters further comprise a quantity of threads, a quantity of iterations, and a model hyperparameter; and wherein starting the background task to perform online updating on the machine learning model based on the target resource information and the target sample data comprises: starting threads used for the current model updating based on the target resource information and the quantity of threads, and controlling, based on the target sample data, the quantity of iterations, and the model hyperparameter, the threads to perform online updating on the machine learning model.

5. The method according to claim 2, wherein sampling, based on the quantity of samples, the target sample data from the kernel mode data corresponding to the database task comprises:

sampling, based on the quantity of samples, access features of N data blocks from a feature table corresponding to the hot-and-cold data identification task, wherein the feature table stores access features of data blocks collected from previous M layers of the persistent storage media; and obtaining static properties of the N data blocks respectively from metadata of the N data blocks, and using the access features and the static properties of the N data blocks as the target sample data, wherein N is a positive integer greater than or equal to 2.

6. The method according to claim 5, further comprising:

for each data block in the previous M layers of the persistent storage media, collecting an access feature of a data block within a sliding window from the previous M layers of the persistent storage media with the sliding window corresponding to the data block, and storing the access feature of the data block to the feature table.

7. The method according to claim 5, wherein calling the machine learning model to perform the hot-and-cold data identification task comprises: calling the machine learning model to perform hot-and-cold data identification on a data block in the persistent storage medium, and outputting a hot-and-cold data identification result.

8. A data processing device, running a database storage engine, wherein the database storage engine is integrated with a machine learning model configured to process a hot-and-cold data identification task in a data layering application scenario, and the database storage engine comprises K layers of persistent storage medium in the data layering application scenario, and the data processing device comprises: a memory and one or more processors, wherein the memory is configured to store a computer program corresponding to the database storage engine; and the one or more processors are configured to execute the computer program corresponding to the database storage engine, to perform operations comprising:

monitoring a usage rate of the persistent storage medium for any layer of persistent storage medium in a previous M layers of the persistent storage medium;

calling, in response to the usage rate of the persistent storage medium having reached a set usage rate threshold, the machine learning model to perform the hot-and-cold data identification task, and triggering a subsequent action based on a task execution result output by the machine learning model;

wherein the triggering the subsequent action based on the task execution result output by the machine learning model comprises: compressing cold data in the persistent storage medium and merging into next layer of the persistent storage medium based on the hot-and-cold data identification result, and prefetching hot data in the persistent storage medium to a memory of the database storage engine, wherein K is a positive integers greater than or equal to 2, and M is a positive integer less than K; and determining, in response to the usage rate of the persistent storage medium having not reached the set usage rate threshold and a set model dynamic updating condition being met, target resource information and target sample data available for current model updating based on current load information of the database storage engine, and starting a background task to perform online updating on the machine learning model based on the target resource information and the target sample data.

9. The device according to claim 8, wherein determining the target resource information and the target sample data available for the current model updating comprises:

obtaining current resource usage status information of the database storage engine, wherein the current resource usage status information represents the current load information of the database storage engine;

determining the target resource information and training parameters available for the current model updating based on the current resource usage status information, wherein the training parameters at least comprise a quantity of samples; and sampling, based on the quantity of samples, the target sample data from kernel mode data corresponding to the hot-and-cold data identification task.

10. The device according to claim 9, wherein determining the target resource information and the training parameters available for the current model updating comprises:

determining the target resource information available for the current model updating based on the current resource usage status information; and determining the training parameters available for the current model updating based on the target resource information and a correspondence between a resource amount and the training parameters obtained through pretraining.

11. The device according to claim 10, wherein the training parameters further comprise a quantity of threads, a quantity of iterations, and a model hyperparameter; and wherein starting the background task to perform online updating on the machine learning model based on the target resource information and the target sample data comprises: starting threads used for the current model updating based on the target resource information and the quantity of threads, and controlling, based on the target sample data, the quantity of iterations, and the model hyperparameter, the threads to perform online updating on the machine learning model.

12. The device according to claim 9, wherein sampling, based on the quantity of samples, the target sample data from the kernel mode data corresponding to the hot-and-cold data identification task comprises:
  sampling, based on the quantity of samples, access features of N data blocks from a feature table corresponding to the hot-and-cold data identification task, wherein the feature table stores access features of data blocks collected from previous M layers of the persistent storage media; and
  obtaining static properties of the N data blocks respectively from metadata of the N data blocks, and using the access features and the static properties of the N data blocks as the target sample data, wherein N is a positive integer greater than or equal to 2.

13. The device according to claim 12, the operations further comprising:
  for each data block in the previous M layers of the persistent storage media, collecting an access feature of a data block within a sliding window from the previous M layers of the persistent storage media with the sliding window corresponding to the data block, and storing the access feature of the data block to the feature table.

14. The device according to claim 12,
  wherein calling the machine learning model to perform the hot-and-cold data identification task comprises: calling the machine learning model to perform hot-and-cold data identification on a data block in the persistent storage medium, and outputting a hot-and-cold data identification result.

15. A non-transitory computer-readable storage medium storing instructions that are executable by one or more processors of a device to cause the device to perform operations to process a hot-and-cold data identification task applicable to a database storage engine integrated with a machine learning model to process the hot-and-cold data identification in a data layering application scenario, and the database storage engine comprises K layers of persistent storage medium in the data layering application scenario, the operations comprising:
  monitoring a usage rate of the persistent storage medium for any layer of persistent storage medium in a previous M layers of the persistent storage medium;
  calling, in response to the usage rate of the persistent storage medium having reached a set usage rate threshold, the machine learning model to perform the hot-and-cold data identification task, and triggering a subsequent action based on a task execution result output by the machine learning model;
  wherein the triggering the subsequent action based on the task execution result output by the machine learning model comprises: compressing cold data in the persistent storage medium and merging into next layer of the persistent storage medium based on the hot-and-cold data identification result, and prefetching hot data in the persistent storage medium to a memory of the database storage engine, wherein K is a positive integers greater than or equal to 2, and M is a positive integer less than K; and
  determining, in response to the usage rate of the persistent storage medium having not reached the set usage rate threshold and a set model dynamic updating condition being met, target resource information and target sample data available for current model updating based on current load information of the database storage engine, and starting a background task to perform online updating on the machine learning model based on the target resource information and the target sample data.

16. The non-transitory computer-readable storage medium according to claim 15, wherein determining the target resource information and the target sample data available for the current model updating comprises:
  obtaining current resource usage status information of the database storage engine, wherein the current resource usage status information represents the current load information of the database storage engine;
  determining the target resource information and training parameters available for the current model updating based on the current resource usage status information, wherein the training parameters at least comprise a quantity of samples; and
  sampling, based on the quantity of samples, the target sample data from kernel mode data corresponding to the hot-and-cold data identification task.

17. The non-transitory computer-readable storage medium according to claim 16, wherein determining the target resource information and the training parameters available for the current model updating comprises:
  determining the target resource information available for the current model updating based on the current resource usage status information; and
  determining the training parameters available for the current model updating based on the target resource information and a correspondence between a resource amount and the training parameters obtained through pretraining.

18. The non-transitory computer-readable storage medium according to claim 17, wherein the training parameters further comprise a quantity of threads, a quantity of iterations, and a model hyperparameter; and
  wherein starting the background task to perform online updating on the machine learning model based on the target resource information and the target sample data comprises: starting threads used for the current model updating based on the target resource information and the quantity of threads, and controlling, based on the target sample data, the quantity of iterations, and the model hyperparameter, the threads to perform online updating on the machine learning model.

19. The non-transitory computer-readable storage medium according to claim 16, wherein sampling, based on the quantity of samples, the target sample data from the kernel mode data corresponding to hot-and-cold data identification task comprises:
  sampling, based on the quantity of samples, access features of N data blocks from a feature table corresponding to the hot-and-cold data identification task, wherein the feature table stores access features of data blocks collected from previous M layers of the persistent storage media; and
  obtaining static properties of the N data blocks respectively from metadata of the N data blocks, and using the access features and the static properties of the N data blocks as the target sample data, wherein N is a positive integer greater than or equal to 2.

20. The non-transitory computer-readable storage medium according to claim 19, the operations further comprising:
  for each data block in the previous M layers of the persistent storage media, collecting an access feature of a data block within a sliding window from the previous M layers of the persistent storage media with the sliding window corresponding to the data block, and storing the access feature of the data block to the feature table.

* * * * *